(12) United States Patent
Bunker

(10) Patent No.: US 9,216,491 B2
(45) Date of Patent: Dec. 22, 2015

(54) COMPONENTS WITH COOLING CHANNELS AND METHODS OF MANUFACTURE

(75) Inventor: Ronald Scott Bunker, Waterford, NY (US)

(73) Assignee: General Electric Company, Niskayuna, NY (US)

( * ) Notice: Subject to any disclaimer, the term of this patent is extended or adjusted under 35 U.S.C. 154(b) by 559 days.

(21) Appl. No.: 13/168,144

(22) Filed: Jun. 24, 2011

(65) Prior Publication Data

US 2012/0328448 A1 Dec. 27, 2012

(51) Int. Cl.
  *F01D 5/18* (2006.01)
  *B24C 1/04* (2006.01)
  *B23K 26/36* (2014.01)
  *B23K 26/38* (2014.01)

(52) U.S. Cl.
  CPC .............. *B24C 1/045* (2013.01); *B23K 26/367* (2013.01); *B23K 26/388* (2013.01); *F01D 5/186* (2013.01); *B23K 2201/001* (2013.01); *F05D 2230/14* (2013.01); *F05D 2230/90* (2013.01); *Y02T 50/672* (2013.01); *Y02T 50/676* (2013.01)

(58) Field of Classification Search
  CPC ...... B24C 1/045; F01D 5/186; B23K 26/367; B23K 26/388
  USPC ......................... 416/97 R, 92, 95, 235, 236 R
  See application file for complete search history.

(56) References Cited

U.S. PATENT DOCUMENTS

| | | | |
|---|---|---|---|
| 5,626,462 A | 5/1997 | Jackson et al. | |
| 5,640,767 A | 6/1997 | Jackson et al. | |
| 5,875,549 A | 3/1999 | McKinley | |
| 5,941,686 A * | 8/1999 | Gupta et al. | 415/178 |
| 6,214,248 B1 | 4/2001 | Browning et al. | |
| 6,234,755 B1 | 5/2001 | Bunker et al. | |
| 6,321,449 B2 | 11/2001 | Zhao et al. | |
| 6,368,060 B1 | 4/2002 | Fehrenbach et al. | |

(Continued)

FOREIGN PATENT DOCUMENTS

| | | |
|---|---|---|
| CN | 101120156 A | 2/2008 |
| CN | 101663465 A | 3/2010 |

(Continued)

OTHER PUBLICATIONS

D.G. Hyams et al., "A Detailed Analysis of film Cooling Physics: Part III—Streamwise Injection With Shaped Holes," Journal of Turbomachinery, vol. 122, Issue 1, Jan. 2000, pp. 122-132.

(Continued)

*Primary Examiner* — Craig Kim
*Assistant Examiner* — Kayla McCaffrey
(74) *Attorney, Agent, or Firm* — Ann M. Agosti

(57) ABSTRACT

A manufacturing method is provided. The manufacturing method includes forming one or more grooves in a component comprising a substrate. Each groove extends at least partially along the substrate and has a base, a top and at least one discharge end. The manufacturing method further includes forming a crater, such that the crater is in fluid connection with the respective discharge end for each groove, and disposing a coating over at least a portion of an outer surface of the substrate. The groove(s) and the coating together define one or more channels for cooling the component. The coating does not completely bridge each of the one or more craters, such that each crater defines a film exit. A component with cratered film exits is also provided.

15 Claims, 5 Drawing Sheets

(56) References Cited

U.S. PATENT DOCUMENTS

| | | | |
|---|---|---|---|
| 6,379,118 B2* | 4/2002 | Lutum et al. | 416/97 R |
| 6,380,512 B1* | 4/2002 | Emer | 219/121.71 |
| 6,383,602 B1 | 5/2002 | Fric et al. | |
| 6,412,541 B2 | 7/2002 | Roesler et al. | |
| 6,551,061 B2 | 4/2003 | Darolia et al. | |
| 6,582,194 B1 | 6/2003 | Birkner et al. | |
| 6,602,053 B2 | 8/2003 | Subramanian et al. | |
| 6,617,003 B1 | 9/2003 | Lee et al. | |
| 6,905,302 B2 | 6/2005 | Lee et al. | |
| 6,921,014 B2 | 7/2005 | Hasz et al. | |
| 7,014,923 B2 | 3/2006 | Schnell et al. | |
| 7,094,475 B2 | 8/2006 | Schnell et al. | |
| 7,186,167 B2 | 3/2007 | Joslin | |
| 7,302,990 B2 | 12/2007 | Bunker et al. | |
| 7,625,180 B1* | 12/2009 | Liang | 416/97 R |
| 7,744,348 B2 | 6/2010 | Bezencon et al. | |
| 7,766,617 B1 | 8/2010 | Liang | |
| 7,775,768 B2 | 8/2010 | Devore et al. | |
| 7,866,948 B1* | 1/2011 | Liang | 416/97 R |
| 8,157,526 B2 | 4/2012 | Beck et al. | |
| 8,607,455 B2 | 12/2013 | Ahmad | |
| 2002/0141872 A1* | 10/2002 | Darolia et al. | 416/241 R |
| 2003/0077434 A1* | 4/2003 | Jansen et al. | 428/220 |
| 2007/0253817 A1* | 11/2007 | Bezencon et al. | 416/97 R |
| 2008/0138529 A1 | 6/2008 | Weaver et al. | |
| 2010/0080688 A1 | 4/2010 | Bezencon et al. | |
| 2012/0111545 A1 | 5/2012 | Bunker et al. | |
| 2012/0148769 A1 | 6/2012 | Bunker et al. | |

FOREIGN PATENT DOCUMENTS

| | | | |
|---|---|---|---|
| EP | 1304395 | A1 | 4/2003 |
| EP | 1387040 | B1 | 4/2004 |

OTHER PUBLICATIONS

B. Wei et al., "Curved Electrode and Electrochemical Machining Method and Assembly Employing the Same," U.S. Appl. No. 12/562,528, filed Sep. 18, 2009.

W. Zhang et al., Process and System for Forming Shaped Air Holes, U.S. Appl. No. 12/697,005, filed Jan. 29, 2010.

B.P. Lacy et al., "Hot Gas Path Component Cooling System," U.S. Appl. No. 12/765,372, filed Apr. 22, 2010.

B. Lacy et a., "Articles Which Include Chevron Film Cooling Holes, and Related Processes," U.S. Appl. No. 12/790,675, filed May 28, 2010.

J.E.J. Lambie et al., "An overview on micro-meso manufacturing techniques for micro-heat exchangers for turbine blade cooling," International Journal Manufacturing Research, vol. 3, No. 1, 2008, pp. 3-26.

R.S. Bunker et al., "Components With Re-Entrant Shaped Cooling Channels and Methods of Manufacture," U.S. Appl. No. 12/943,624, filed Nov. 10, 2010.

R.S. Bunker et al., "Component and Methods of Fabricating and Coating a Component," U.S. Appl. No. 12/943,646, filed Nov. 10, 2010.

R.S.Bunker et al., "Method of Fabricating a Component Using a Fugitive Coating," U.S. Appl. No. 12/943,563, filed Nov. 10, 2010.

R.S. Bunker et al., "Components With Cooling Channels and Methods of Manufacture," U.S. Appl. No. 12/965,083, filed Dec. 10, 2010.

R. S. Bunker et al., "Method of Fabricating a Component Using a Two-Layer Structural Coating," U.S. Appl. No. 12/996,101, filed Dec. 13, 2010.

R.S. Bunker et al., "Turbine Components With Cooling Features and Methods of Manufacturing the Same," U.S. Appl. No. 12/953,177, filed Nov. 23, 2010.

R.S. Bunker, "Components With Cooling Channels and Methods of Manufacture," U.S. Appl. No. 13/026,595, filed Feb. 14, 2011.

R. Rebak et al., "Methods of Fabricating a Coated Component Using Multiple Types of Fillers," U.S. Appl. No. 13/083,701, filed Apr. 11, 2011.

R. Bunker et al., "Components With Cooling Channels Formed in Coating and Methods of Manufacture", U.S. Appl. No. 13/052,415, filed Mar. 21, 2011.

R.B. Rebak et al., "Component and Methods of Fabricating a Coated Component Using Multiple Types of Fillers," U.S. Appl. No. 13/095,129, filed Apr. 27, 2011.

Search Report and Written Opinion from corresponding EP Application No. 12172765.5 dated Sep. 4, 2012.

Unofficial English Translation of Chinese Office Action issued in connection with corresponding CN Application No. 201210209825.5 on Jan. 4, 2015.

\* cited by examiner

COMPONENTS WITH COOLING CHANNELS AND METHODS OF MANUFACTURE

BACKGROUND

The invention relates generally to gas turbine engines, and, more specifically, to micro-channel cooling therein.

In a gas turbine engine, air is pressurized in a compressor and mixed with fuel in a combustor for generating hot combustion gases. Energy is extracted from the gases in a high pressure turbine (HPT), which powers the compressor, and in a low pressure turbine (LPT), which powers a fan in a turbofan aircraft engine application, or powers an external shaft for marine and industrial applications.

Engine efficiency increases with temperature of combustion gases. However, the combustion gases heat the various components along their flowpath, which in turn requires cooling thereof to achieve a long engine lifetime. Typically, the hot gas path components are cooled by bleeding air from the compressor. This cooling process reduces engine efficiency, as the bled air is not used in the combustion process.

Gas turbine engine cooling art is mature and includes numerous patents for various aspects of cooling circuits and features in the various hot gas path components. For example, the combustor includes radially outer and inner liners, which require cooling during operation. Turbine nozzles include hollow vanes supported between outer and inner bands, which also require cooling. Turbine rotor blades are hollow and typically include cooling circuits therein, with the blades being surrounded by turbine shrouds, which also require cooling. The hot combustion gases are discharged through an exhaust which may also be lined, and suitably cooled.

In all of these exemplary gas turbine engine components, thin metal walls of high strength superalloy metals are typically used for enhanced durability while minimizing the need for cooling thereof. Various cooling circuits and features are tailored for these individual components in their corresponding environments in the engine. For example, a series of internal cooling passages, or serpentines, may be formed in a hot gas path component. A cooling fluid may be provided to the serpentines from a plenum, and the cooling fluid may flow through the passages, cooling the hot gas path component substrate and coatings. However, this cooling strategy typically results in comparatively low heat transfer rates and non-uniform component temperature profiles.

Micro-channel cooling has the potential to significantly reduce cooling requirements by placing the cooling as close as possible to the heated region, thus reducing the temperature difference between the hot side and cold side of the main load bearing substrate material for a given heat transfer rate. However, each micro-channel requires a film exit, the precise location of which can be challenging. As hot gas path components may include hundreds of micro-channels, hundreds of film exits must be precisely located.

It would therefore be desirable to provide a robust and efficient means for forming exit regions for micro-channels.

BRIEF DESCRIPTION

One aspect of the present invention resides in a manufacturing method that includes forming one or more grooves in a component comprising a substrate. Each groove extends at least partially along the substrate and has a base, a top and at least one discharge end. The manufacturing method further includes forming a crater, such that the crater is in fluid connection with the respective discharge end for each groove, and disposing a coating over at least a portion of an outer surface of the substrate. The groove(s) and the coating together define one or more channels for cooling the component. The coating does not completely bridge each of the one or more craters, such that each crater defines a film exit.

Another aspect of the present invention resides in a component that includes a substrate comprising an outer surface and an inner surface. The component defines one or more grooves and one or more craters. Each groove extends at least partially along the substrate and has a base and at least one discharge end. Each crater is in fluid connection with the respective discharge end for a respective groove. The component further includes a coating disposed over at least a portion of the outer surface of the substrate, such that the groove(s) and the coating together define one or more channels for cooling the component. The coating does not completely bridge each of the one or more craters, such that each crater defines a film exit through the coating for the respective channel.

DRAWINGS

These and other features, aspects, and advantages of the present invention will become better understood when the following detailed description is read with reference to the accompanying drawings in which like characters represent like parts throughout the drawings, wherein.

Figure 3:
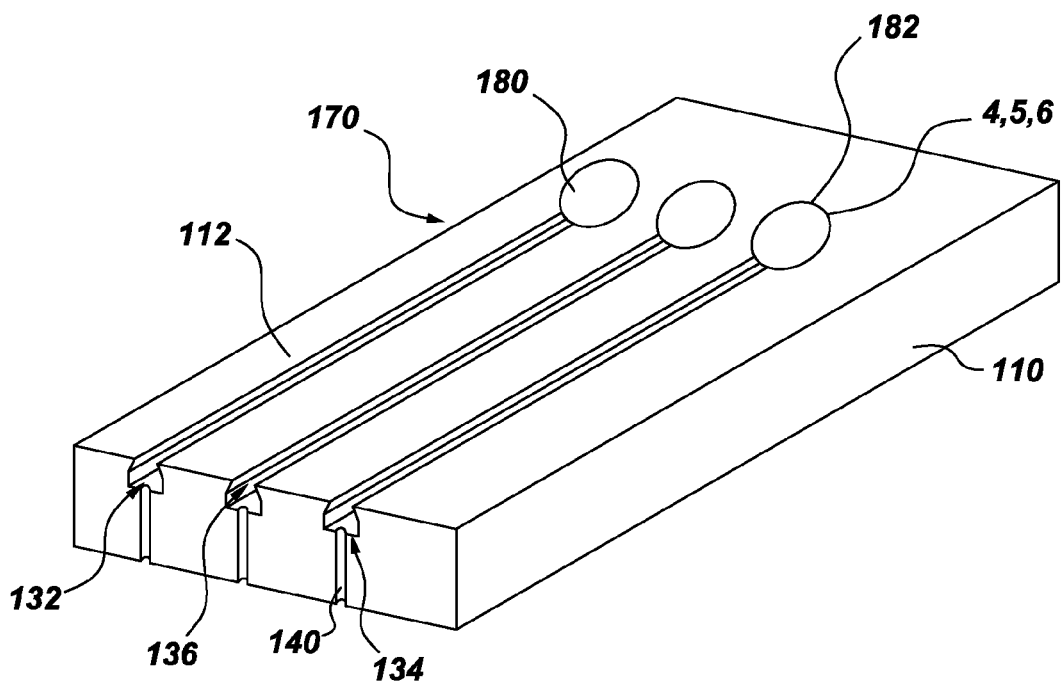
Figure 4:
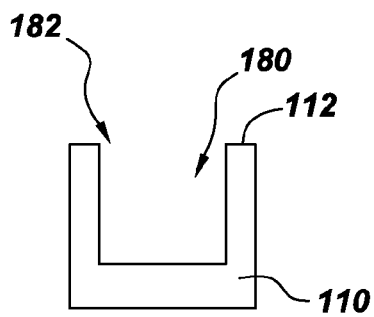
Figure 5:
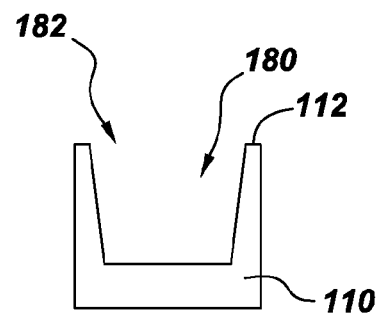
Figure 6:
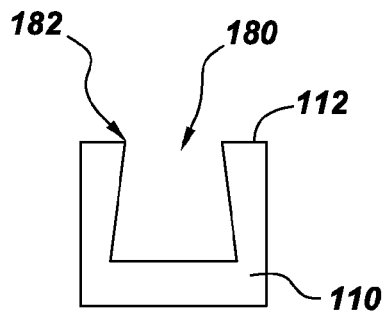
Figure 7:
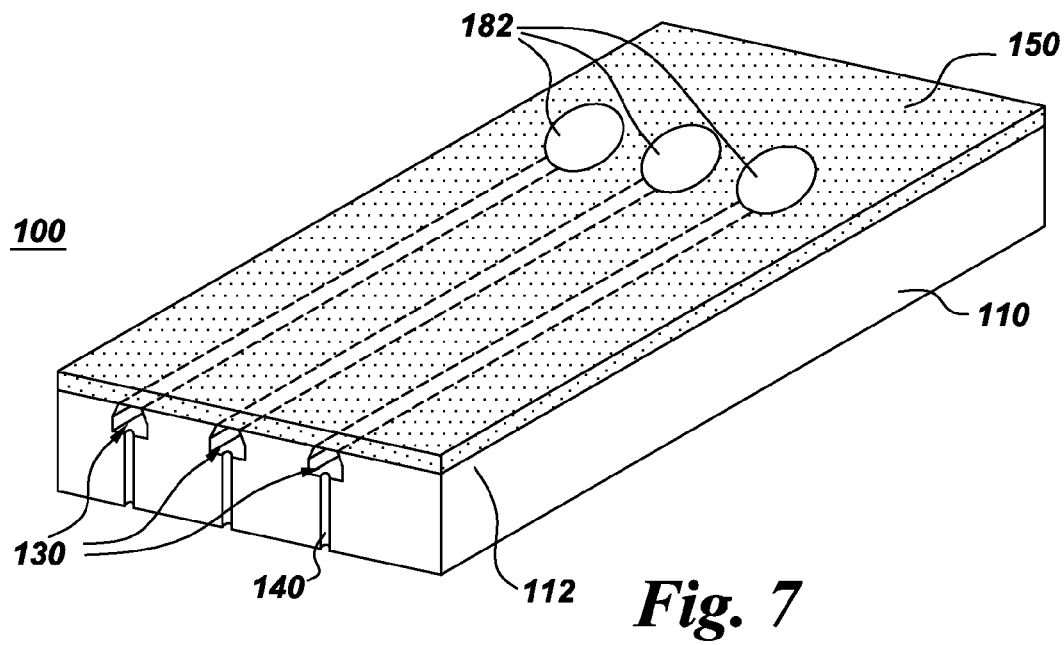
Figure 8:
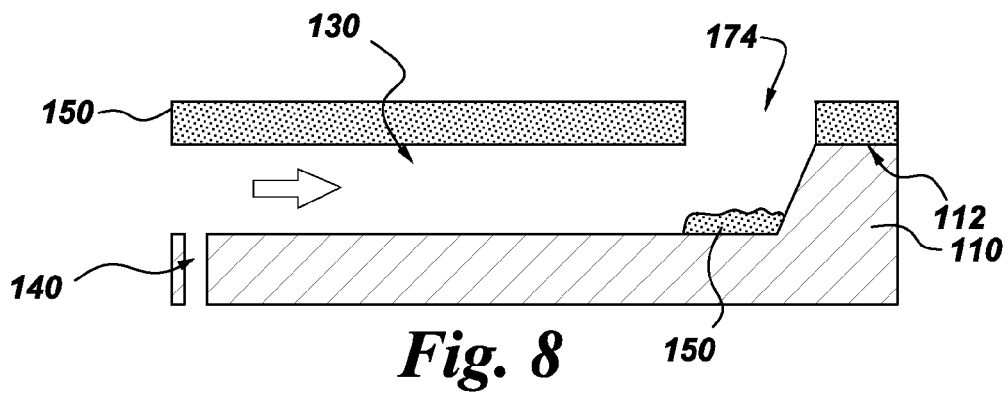
Figure 9:
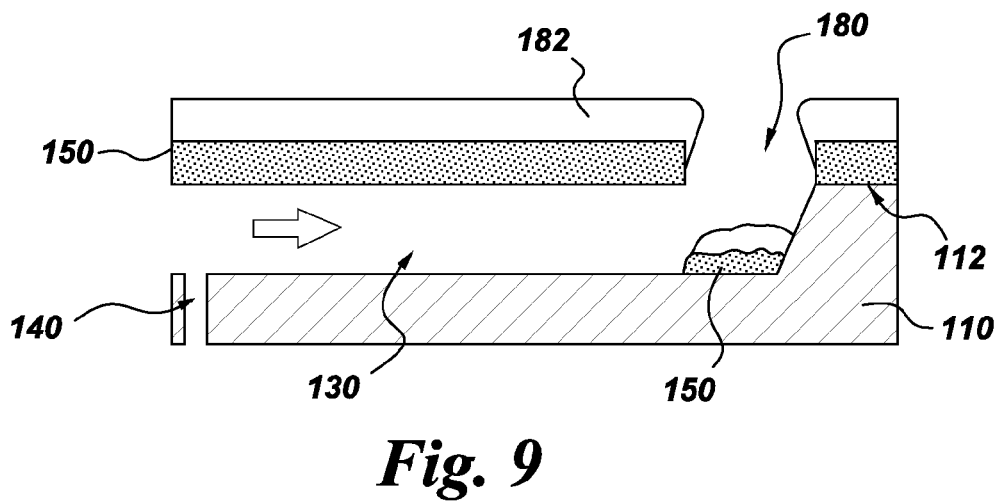
Figure 10:
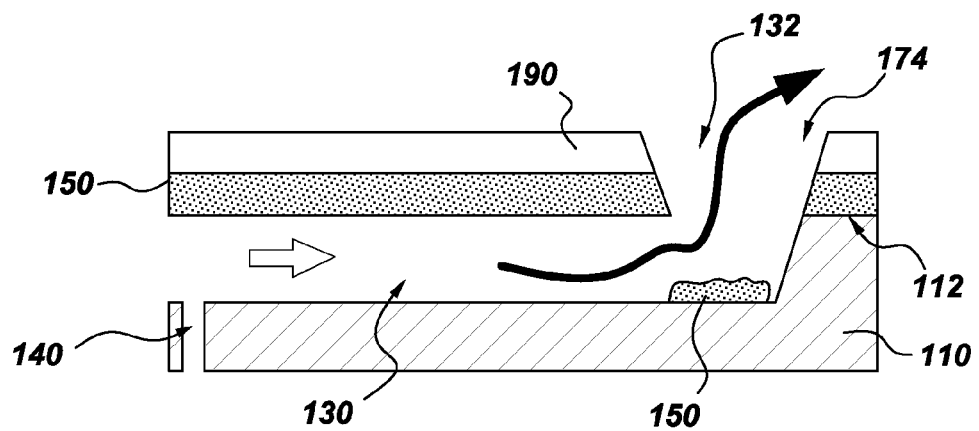
Figure 11:
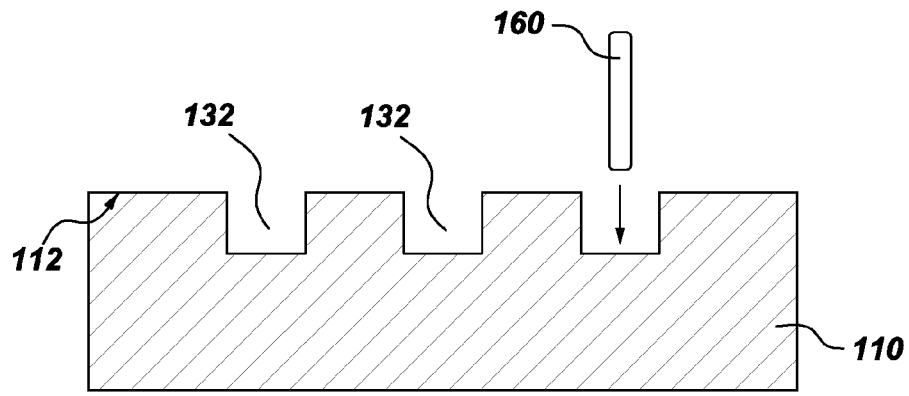
Figure 12:
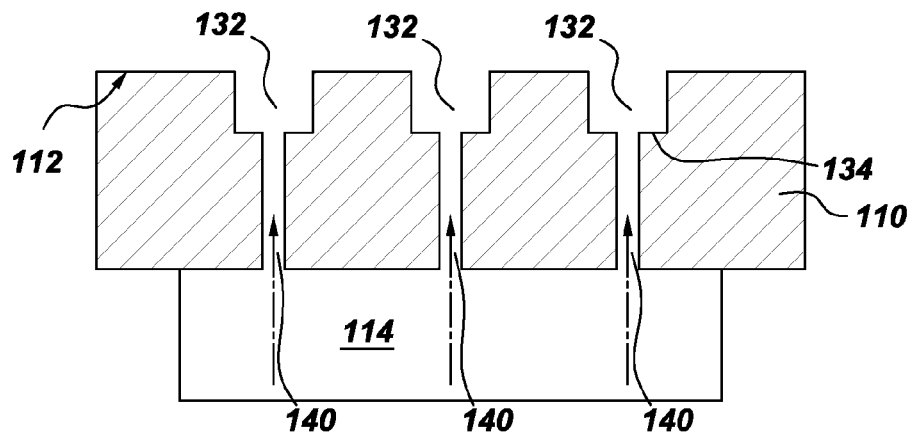
Figure 13:
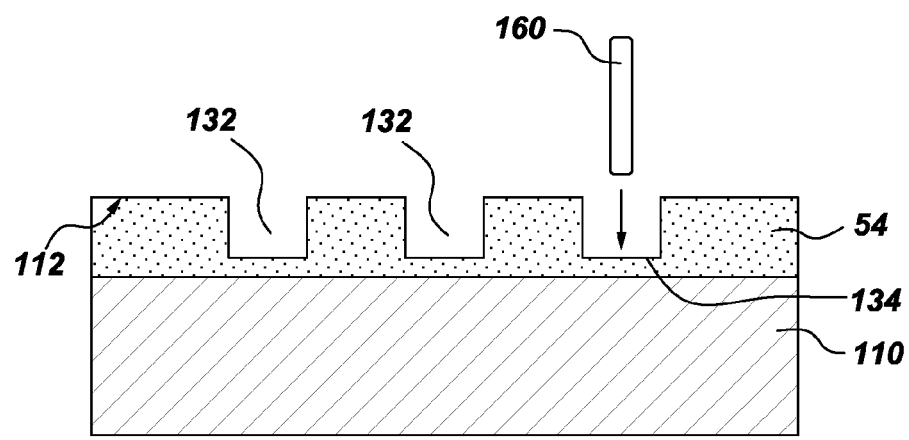
Figure 14:
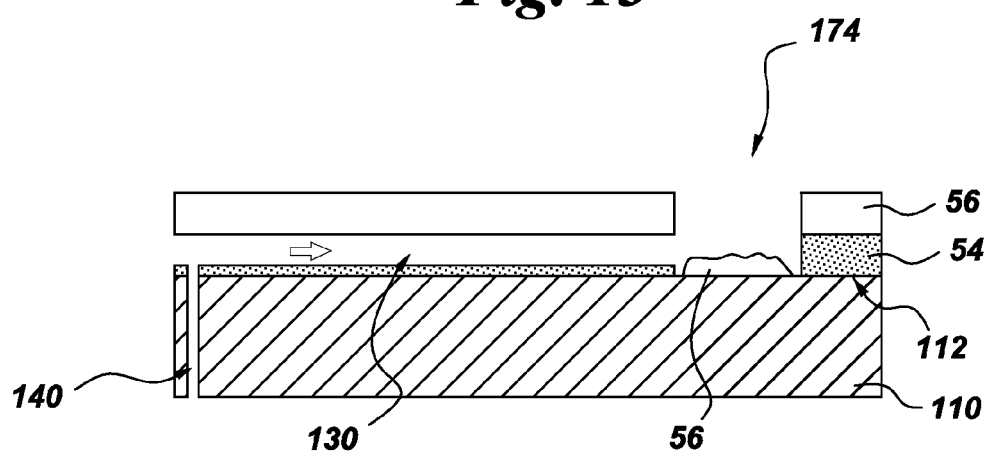
Figure 15:
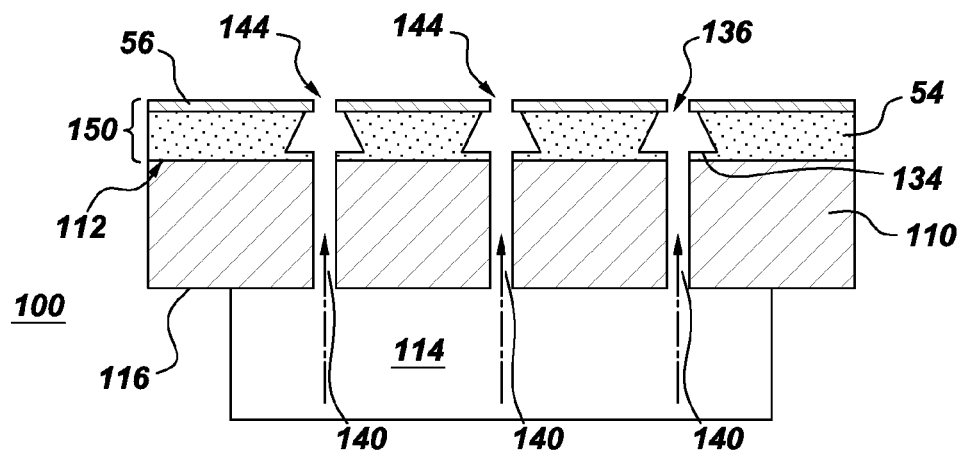

FIG. 3 schematically depicts, in perspective view, three example re-entrant shaped cooling grooves that extend partially along the surface of the substrate and channel coolant to cratered exit regions;

FIG. 4 schematically depicts a cross-section of an exit crater with a perimeter that is normal to the outer surface of the substrate;

FIG. 5 schematically depicts a cross-section of an exit crater with a perimeter that is beveled outward relative to the outer surface of the substrate;

FIG. 6 schematically depicts a cross-section of an exit crater with a perimeter that is beveled inward relative to the outer surface of the substrate;

FIG. 7 schematically depicts, in perspective view, three example re-entrant shaped cooling channels that extend partially along the surface of the substrate and channel coolant to cratered exit regions that extend, at least partially, through a coating disposed over the substrate;

FIG. 8 is a cross-sectional view of one of the example cooling channels of FIG. 7 and shows the channel conveying coolant from an access hole to a cratered exit region;

FIG. 9 is a cross-sectional view of a portion of one of the example cooling channels with an additional second coating, such as a thermal barrier coating, disposed over the structural coating, where the second coating has also coated down within the crater;

FIG. 10 shows the example cooling channel of FIG. 9 with the second coating removed from the crater and with a crater perimeter that is beveled outward relative to the outer surface of the substrate;

FIGS. 11 and 12 illustrate example process steps for forming a component;

FIGS. 13 and 14 schematically illustrates process steps for forming channels and craters in a structural coating; and FIG. 15 shows re-entrant shaped channels with permeable slots formed in a structural coating;

DETAILED DESCRIPTION

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The modifier "about" used in connection with a quantity is inclusive of the stated value, and has the meaning dictated by context, (e.g., includes the degree of error associated with measurement of the particular quantity). In addition, the term "combination" is inclusive of blends, mixtures, alloys, reaction products, and the like.

Moreover, in this specification, the suffix "(s)" is usually intended to include both the singular and the plural of the term that it modifies, thereby including one or more of that term (e.g., "the passage hole" may include one or more passage holes, unless otherwise specified). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. Similarly, reference to "a particular configuration" means that a particular element (e.g., feature, structure, and/or characteristic) described in connection with the configuration is included in at least one configuration described herein, and may or may not be present in other configurations. In addition, it is to be understood that the described inventive features may be combined in any suitable manner in the various embodiments and configurations.

Figure 1:
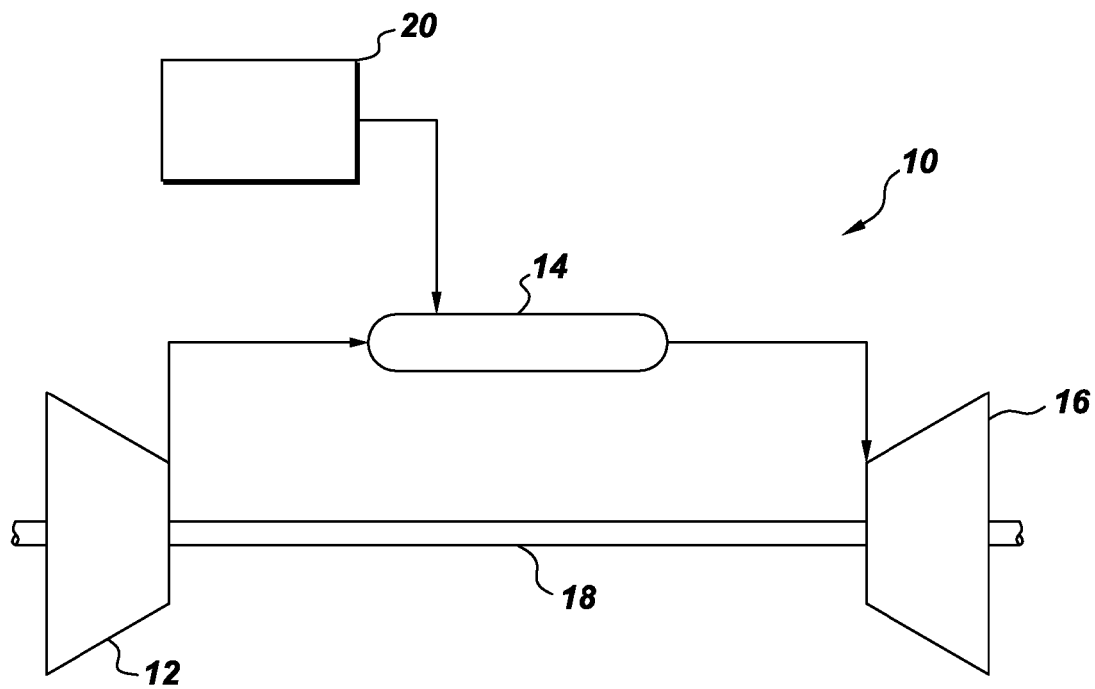
FIG. 1 is a schematic illustration of a gas turbine system.

FIG. 1 is a schematic diagram of a gas turbine system 10. The system 10 may include one or more compressors 12, combustors 14, turbines 16, and fuel nozzles 20. The compressor 12 and turbine 16 may be coupled by one or more shaft 18. The shaft 18 may be a single shaft or multiple shaft segments coupled together to form shaft 18.

The gas turbine system 10 may include a number of hot gas path components 100. A hot gas path component is any component of the system 10 that is at least partially exposed to a high temperature flow of gas through the system 10. For example, bucket assemblies (also known as blades or blade assemblies), nozzle assemblies (also known as vanes or vane assemblies), shroud assemblies, transition pieces, retaining rings, and compressor exhaust components are all hot gas path components. However, it should be understood that the hot gas path component 100 of the present invention is not limited to the above examples, but may be any component that is at least partially exposed to a high temperature flow of gas. Further, it should be understood that the hot gas path component 100 of the present disclosure is not limited to components in gas turbine systems 10, but may be any piece of machinery or component thereof that may be exposed to high temperature flows.

When a hot gas path component 100 is exposed to a hot gas flow, the hot gas path component 100 is heated by the hot gas flow and may reach a temperature at which the hot gas path component 100 fails. Thus, in order to allow system 10 to operate with hot gas flow at a high temperature, increasing the efficiency and performance of the system 10, a cooling system for the hot gas path component 100 is required.

In general, the cooling system of the present disclosure includes a series of small channels, or micro-channels, formed in the surface of the hot gas path component 100. For industrial sized power generating turbine components, "small" or "micro" channel dimensions would encompass approximate depths and widths in the range of 0.25 mm to 1.5 mm, while for aviation sized turbine components channel dimensions would encompass approximate depths and widths in the range of 0.15 mm to 0.5 mm. The hot gas path component may be provided with a cover layer. A cooling fluid may be provided to the channels from a plenum, and the cooling fluid may flow through the channels, cooling the cover layer.

A manufacturing method is described with reference to FIGS. 2-14. As indicated in FIG. 11, for example, the manufacturing method includes forming one or more grooves 132 in a component 100 comprising a substrate 110. As shown for example in FIG. 3, each groove 132 extends at least partially along the substrate 110 and has a base 134, a top 136 and at least one discharge end 170. Although the grooves are shown as being re-entrant shaped, the grooves 132 can have any configuration, for example, they may be straight, curved, or have multiple curves.

The substrate 110 is typically cast prior to forming the groove(s) 132 and the crater(s) 180. As discussed in U.S. Pat. No. 5,626,462, substrate 110 may be formed from any suitable material. Depending on the intended application for component 100, this could include Ni-base, Co-base and Fe-base superalloys. The Ni-base superalloys may be those containing both γ and γ' phases, particularly those Ni-base superalloys containing both γ and γ' phases wherein the γ' phase occupies at least 40% by volume of the superalloy. Such alloys are known to be advantageous because of a combination of desirable properties including high temperature strength and high temperature creep resistance. The substrate material may also comprise a NiAl intermetallic alloy, as these alloys are also known to possess a combination of superior properties including high temperature strength and high temperature creep resistance that are advantageous for use in turbine engine applications used for aircraft. In the case of Nb-base alloys, coated Nb-base alloys having superior oxidation resistance will be preferred, particularly those alloys comprising Nb-(27-40)Ti-(4.5-10.5)Al-(4.5-7.9)Cr-(1.5-5.5)Hf-(0-6)V, where the composition ranges are in atom percent. The substrate material may also comprise a Nb-base alloy that contains at least one secondary phase, such as a Nb-containing intermetallic compound comprising a silicide, carbide or boride. Such alloys are composites of a ductile phase (i.e., the Nb-base alloy) and a strengthening phase (i.e., a Nb-containing intermetallic compound). For other arrangements, the substrate material comprises a molybdenum based alloy, such as alloys based on molybdenum (solid solution) with $Mo_5SiB_2$ and $Mo_3Si$ second phases. For other configurations, the substrate material comprises a ceramic matrix composite, such as a silicon carbide (SiC) matrix reinforced with SiC fibers. For other configurations the substrate material comprises a TiAl-based intermetallic compound.

The grooves 132 may be formed using a variety of techniques. For example, the grooves 132 may be formed using one or more of an abrasive liquid jet, plunge electrochemical machining (ECM), electric discharge machining (EDM) with a spinning single point electrode ("milling" EDM) and laser machining (laser drilling) Example laser machining techniques are described in commonly assigned, U.S. patent application Ser. No. 12/697,005, "Process and system for forming shaped air holes" filed Jan. 29, 2010, which is incorporated by reference herein in its entirety. Example EDM techniques are described in commonly assigned U.S. patent application Ser. No. 12/790,675, "Articles which include chevron film cooling holes, and related processes," filed May 28, 2010, which is incorporated by reference herein in its entirety.

For particular process configurations, the grooves 132 are formed by directing an abrasive liquid jet 160 at the surface 112 of the substrate 110, as schematically depicted in FIG. 11. Example water jet drilling processes and systems are provided in U.S. patent application Ser. No. 12/790,675. As explained in U.S. patent application Ser. No. 12/790,675, the water jet process typically utilizes a high-velocity stream of abrasive particles (e.g., abrasive "grit"), suspended in a stream of high pressure water. The pressure of the water may vary considerably, but is often in the range of about 35-620 MPa. A number of abrasive materials can be used, such as garnet, aluminum oxide, silicon carbide, and glass beads. Beneficially, the water jet process does not involve heating of the substrate 110 to any significant degree. Therefore, there is no "heat-affected zone" formed on the substrate surface 112, which could otherwise adversely affect the desired exit geometry for the grooves 132.

In addition, and as explained in U.S. patent application Ser. No. 12/790,675, the water jet system can include a multi-axis computer numerically controlled (CNC) unit. The CNC systems themselves are known in the art, and described, for example, in U.S. Patent Publication 2005/0013926 (S. Rutkowski et al), which is incorporated herein by reference. CNC systems allow movement of the cutting tool along a number of X, Y, and Z axes, as well as rotational axes.

For the example arrangement shown in FIG. 3, the component manufacturing method further includes forming a crater 180, such that the crater is in fluid connection with the respective discharge end 170 for each groove 132. As indicated, for example, in FIG. 7, the component manufacturing method further includes disposing a coating 150 over at least a portion of an outer surface 112 of the substrate 110. As indicated, for example, in FIG. 7, the groove(s) 132 and the coating 150 together define one or more channels 130 for cooling the component 100. As indicated, for example, in FIGS. 7 and 8, the coating 150 does not completely bridge each of the craters 180, such that each crater 180 defines a film exit 174 through the coating 150 for the respective channel 130.

Beneficially, the grooves and the craters may be formed using the same machining set-up, such that the initial film hole discharge sites are cut prior to the application of the coating(s). The discharge sites are sufficiently large, and as discussed below, may be provided with shaping, such that the coating(s) do not completely bridge over the opening. This leaves the film exit location clearly discernable for subsequent removal of the excess coatings from the site, as discussed below, for example by abrasive liquid jet, and final shaping to create an effective film coverage. Desirably, the resulting process and shaping are robust and forgiving of variations.

Coating 150 comprises a suitable material and is bonded to the component. For particular configurations, the coating 150 has a thickness in the range of 0.1-2.0 millimeters, and more particularly, in the range of 0.1 to 1 millimeter, and still more particularly 0.1 to 0.5 millimeters for industrial components. For aviation components, this range is typically 0.1 to 0.25 millimeters. However, other thicknesses may be utilized depending on the requirements for a particular component 100.

The coating 150 comprises structural coating layers and may further include optional additional coating layer(s). The coating layer(s) may be deposited using a variety of techniques. For particular processes, the structural coating layer(s) are deposited by performing an ion plasma deposition (cathodic arc). Example ion plasma deposition apparatus and method are provided in commonly assigned, U.S. Published Patent Application No. 10080138529, Weaver et al, "Method and apparatus for cathodic arc ion plasma deposition," which is incorporated by reference herein in its entirety. Briefly, ion plasma deposition comprises placing a cathode formed of a coating material into a vacuum environment within a vacuum chamber, providing a substrate 110 within the vacuum environment, supplying a current to the cathode to form a cathodic arc upon a cathode surface resulting in arc-induced erosion of coating material from the cathode surface, and depositing the coating material from the cathode upon the substrate surface 112.

Non-limiting examples of a coating deposited using ion plasma deposition include structural coatings, as well as bond coatings and oxidation-resistant coatings, as discussed in greater detail below with reference to U.S. Pat. No. 5,626,462. For certain hot gas path components 100, the structural coating comprises a nickel-based or cobalt-based alloy, and more particularly comprises a superalloy or a (NiCo)CrAlY alloy. For example, where the substrate material is a Ni-base superalloy containing both γ and γ' phases, structural coating may comprise similar compositions of materials, as discussed in greater detail below with reference to U.S. Pat. No. 5,626,462.

For other process configurations, a structural coating is deposited by performing at least one of a thermal spray process and a cold spray process. For example, the thermal spray process may comprise combustion spraying or plasma spraying, the combustion spraying may comprise high velocity oxygen fuel spraying (HVOF) or high velocity air fuel spraying (HVAF), and the plasma spraying may comprise atmospheric (such as air or inert gas) plasma spray, or low pressure plasma spray (LPPS, which is also know as vacuum plasma spray or VPS). In one non-limiting example, a NiCrAlY coating is deposited by HVOF or HVAF. Other example techniques for depositing the structural coating include, without limitation, sputtering, electron beam physical vapor deposition, electroless plating, and electroplating.

For certain configurations, it is desirable to employ multiple deposition techniques for depositing structural and optional additional coating layers. For example, a first structural coating layer may be deposited using an ion plasma deposition, and a subsequently deposited layer and optional additional layers (not shown) may be deposited using other techniques, such as a combustion spray process or a plasma spray process. Depending on the materials used, the use of different deposition techniques for the coating layers may provide benefits in properties, such as, but not restricted to strain tolerance, strength, adhesion, and/or ductility.

Similar to the grooves, the craters 180 may be formed using a variety of techniques. For example, the craters 180 may be formed using one or more of an abrasive liquid jet, plunge electrochemical machining (ECM), electric discharge machining (EDM) with a spinning single point electrode ("milling" EDM) and laser machining (laser drilling). For particular processes, each groove 132 is formed by directing an abrasive liquid jet 160 at the outer surface 112 of the substrate 110, as shown for example in FIG. 11, and each crater 180 is formed using the abrasive liquid jet 160. For example, the exit craters 180 may be formed between passes to form the grooves 132, or may be formed after the grooves 132 have been formed, or may be formed prior to the grooves, such that the exit craters serve as a starting location for the grooves. (Typically, the grooves 132 will be formed by performing multiple passes with the abrasive liquid jet.) For particular processes, some machining of the craters 180 will be performed between machining passes on the grooves 132, and then the final machining operations for the craters 180 will be performed after the grooves 132 are finished. For particular processes, the abrasive liquid jet 160 is used to form each crater 180 to the same depth as that of the respective channel 130. Beneficially, for these processes, the grooves and craters may be formed using the same machining set-up, such that the initial film hole discharge sites are cut prior to the application of the coating(s). By forming the craters to the same depth as that of the respective channel 130 (as shown, for example in FIG. 8), the discharge site is sufficiently large, such that the coating(s) will not bridge over the opening. As noted above, this leaves the film exit location clearly discernable for subsequent removal of the excess coatings from the site (as discussed below), and final shaping to create an effective film coverage.

As noted above, the craters 180 may be shaped to ensure that the coating(s) will not bridge over the openings thereof. For example, as indicated in FIG. 5, the perimeter 182 of the crater 180 is beveled outward relative to the outer surface 112 of the substrate 110. This beveled crater may be formed, for example, by angling the abrasive water jet 160 relative to the outer surface 112 of the substrate 110. For other configurations, the perimeter 182 of the crater 180 may be normal to the outer surface 112 of the substrate 110 (FIG. 4) or may be beveled inward relative to the outer surface 112 of the substrate 110 (FIG. 6).

For the example configuration shown in FIGS. 3 and 7, the base 134 of each groove is wider than the top 136, such that each groove 132 comprises a re-entrant shaped groove 132. Typically, each crater will have a top surface diameter that is larger than the average width of the re-entrant shaped groove 132. In this manner, the coating 150 will not completely bridge the crater 180, such that the crater forms a film exit 174 for the respective channel 130, as indicated in FIGS. 8-10, for example. Although the channels 130 are shown as being re-entrant shaped in FIGS. 3 and 7, for other configurations, the channels 130 may be open. As used herein, an "open-shaped" groove (or channel) should be understood to be a groove (or channel) where the top opening is locally of similar width or greater than the rest of the groove (or channel).

Figure 2:
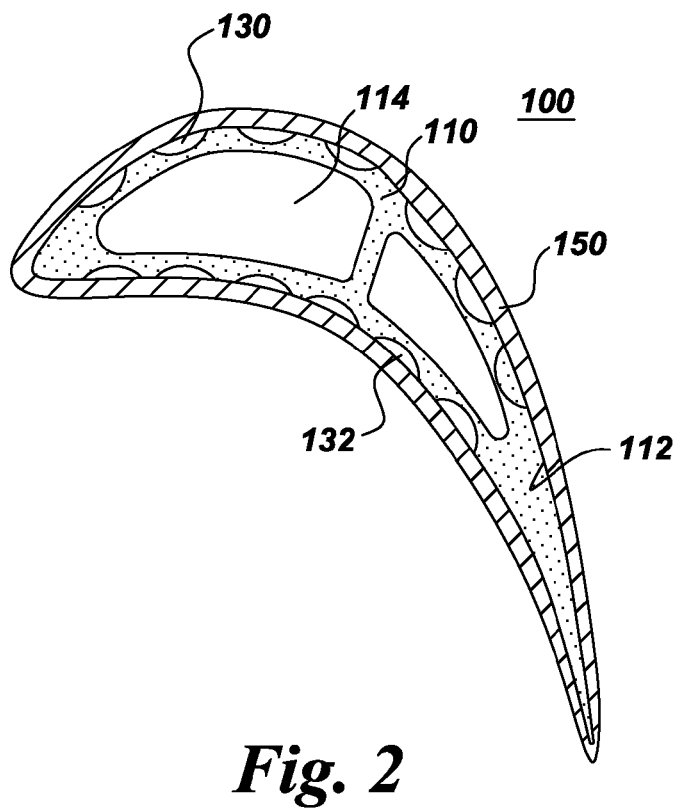
FIG. 2 is a schematic cross-section of an example airfoil configuration with cooling channels, in accordance with aspects of the present invention.

For the example component shown in FIG. 2, the substrate 110 has at least one interior space 114. For the example process shown in FIG. 12, the manufacturing method further includes forming one or more access holes 140 through the base 134 of a respective one of the grooves 132, to connect the groove 132 in fluid communication with the respective hollow interior space 114. The access holes 140 are typically drilled after the grooves 132 have been machined or in the same process as machining the grooves. The access holes 140 are typically circular or oval in cross-section and may be formed, for example using one or more of laser machining (laser drilling), abrasive liquid jet, EDM and electron beam drilling. The access holes 140 may be normal to the base 134 of the respective grooves 132 (as shown in FIG. 12) or, more generally, may be drilled at angles in a range of 20-90 degrees relative to the base 134 of the groove 132.

As indicated, for example, in FIGS. 8-10, a portion of the coating 150 may be deposited in the crater(s) 180. For particular processes, the method further includes removing at least some of the coating 150 deposited in each crater 180 to form the film hole 174 (FIGS. 8 and 10) for the respective channel 130. For example, the water jet 160 may be used to remove some or all of the deposited coatings from the craters. For certain configurations and as indicated by FIGS. 9 and 10, the structural (metallic) coating layer may be left inside the crater, and the ceramic thermal barrier coating (TBC) may be removed, for example using the abrasive liquid jet 160. Beneficially, the residual structural coating within the crater will act as a cooling flow distributer, forcing the coolant to spread out inside the crater prior to exiting onto the external surface of the coated component, as indicated schematically in FIG. 10.

For the example configurations shown in FIGS. 3 and 7, the grooves 132 are formed in the substrate 110, and the craters 180 extend into the substrate. FIGS. 13 and 14 illustrate related processes where the grooves 132 and craters are formed at least partially in an inner structural coating 54. For the example configurations shown in FIGS. 13 and 14, the coating 150 comprises an outer layer 56 of a structural coating, and the manufacturing method further includes depositing an inner layer 54 of a structural coating on the outer surface 112 of the substrate (110) prior to forming the grooves 132 and craters 180. As indicated in FIGS. 13 and 14, each of the grooves 132 and craters 180 are formed at least partially in the inner structural coating 54. For the configurations shown in FIGS. 13 and 14, the grooves and craters do not extend into the substrate 110. For other configurations, the grooves and craters extend through the inner structural coating layer 54 into the substrate and are formed by machining the substrate 110 through the inner structural coating layer 54. In addition, although not expressly shown, the grooves and craters may be formed by machining through a fugitive coating, as discussed in commonly assigned U.S. patent application Ser. No. 12/943,563, Ronald S. Bunker et al., "Method of fabricating a component using a fugitive coating," which is incorporated by reference herein in its entirety.

Beneficially, the above-described manufacturing method provides a robust process for locating and forming film exits for cooling channels. The process is efficient, in that the cooling channels and craters can be machined using the same set-up. The craters leave the film exits clearly discernible for subsequent removal of any excess coatings from the site and final shaping to create an effective film coverage.

A component 100 is described with reference to FIGS. 2-15. As indicated, for example, in FIG. 2, the component 100 includes a substrate 110 comprising an outer surface 112 and an inner surface 116. As indicated, for example, in FIG. 3, the component 100 defines one or more grooves 132 and one or more craters 180. As indicated, for example, in FIG. 3, each groove 132 extends at least partially along the substrate 110 and has a base 134 and at least one discharge end 170. As indicated, for example, in FIG. 9, each crater 172 is in fluid connection with the respective discharge end 170 for a respective groove 132.

The component 100 further includes a coating 150 disposed over at least a portion of the outer surface 112 of the substrate 110, such that the groove(s) 132 and the coating 150 together define one or more channels 130 for cooling the component 100. The coating comprises one or more layers and is described above. As indicated in FIGS. 7-10, the coating 150 does not completely bridge each of the craters 180, such that each crater 180 defines a film exit 174 (FIGS. 8 and 10) through the coating 150 for the respective channel 130.

As noted above, the craters 180 may be shaped to ensure that the coating(s) will not bridge over the openings thereof. For example, the crater perimeter may be beveled outward (FIG. 5) or inward (FIG. 6) relative to the outer surface 112 of the substrate (110) or may be normal (FIG. 4) to the outer surface 112 of the substrate 110. As noted above, the beveled crater may be formed, for example, by angling the abrasive water jet 160 relative to the outer surface 112 of the substrate 110. For particular configurations, the beveled edge angle is in a range of 0 to 70 degrees from the external surface normal.

Beneficially, this angle can help the film cooling to diffuse on the surface to be cooled. In addition, it should be noted that the final shape of the crater need not be precisely round or oval. In fact, it can be fairly approximate or even jagged and still perform well. Further, for particular configurations (not shown), the beveled or angled edge of the film discharge may be formed in only the flow direction portion of the exit, such that coolant is diffused only in the most beneficial direction relative the external hot gases. This is similar to the shaped run-out regions discussed with reference to FIG. 8 in commonly assigned, U.S. patent application Ser. No. 13/026,595, Ronald S. Bunker, "Components with cooling channels and methods of manufacture," which is incorporated by reference herein in its entirety. Such a downstream shaped edge may be formed in the initial crater, for example, by allowing the water jet to run out as it is lifted off the surface.

Typically, each crater will have a top surface diameter that is at least as large as the average width of the respective groove 132. In this manner, the coating 150 will not completely bridge the crater 180, such that the crater forms a film exit 174 for the respective channel 130, as indicated in FIGS. 8-10, for example. For the illustrated arrangements shown in FIGS. 3 and 7, the base 134 of each groove is wider than the top 136, such that each groove 132 comprises a re-entrant shaped groove 132. However, for other configurations, the grooves 132 may be open. Techniques for forming re-entrant grooves 132 are provided in commonly assigned, U.S. patent application Ser. No. 12/943,624, Ronald S. Bunker et al., "Components with re-entrant shaped cooling channels and methods of manufacture," which patent application is incorporated by reference herein in its entirety. Beneficially, the coating 150 can be deposited over unfilled re-entrant grooves 132 (that is, without filling or partial filling the groove with a sacrificial filler). In addition, the re-entrant grooves provide enhanced cooling relative to a simple shaped groove (namely, grooves with tops 136 and bases 134 of approximately equal width).

In addition to the film exits 174 formed through the craters 180, permeable slots 144 (porous gaps 144) may extend through at least partially through coating 150 to enhance the cooling of re-entrant shaped cooling channels 130. FIG. 15 schematically depicts three re-entrant shaped cooling channels 130 formed in the inner structural coating 54 with permeable slots 144 extending through the coating to provide additional cooling flow from the cooling channels 130 to the exterior surface of the coated component 100. Permeable slots 144 are described in commonly assigned, U.S. patent application Ser. No. 12/966,101, Ronald S. Bunker et al., "Method of fabricating a component using a two-layer structural coating." More particularly, for the arrangement shown in FIG. 15, the second layer of the structural coating 56 defines one or more permeable slots 144, such that the second structural coating layer 56 does not completely bridge each of the one or more grooves 132. Although the permeable slots 144 are shown for the case of re-entrant channels 130, permeable slots 144 may also be formed for other channel geometries. Typically the permeable slots (gaps) 144 have irregular geometries, with the width of the gap 144 varying, as the structural coating is applied and builds up a thickness. As the first layer of the structural coating is applied to the substrate 110, the width of the gap 144 may narrow from approximately the width of the top 136 of the channel 130, as the structural coating is built up. For particular examples, the width of gap 144, at its narrowest point, is 5% to 20% of the width of the respective channel top 136. In addition, the permeable slot 144 may be porous, in which case the "porous" gap 144 may have some connections, that is, some spots or localities that have zero gap. Beneficially, the gaps 144 provide stress relief for the coating 150.

Depending on their specific function, the permeable slots 144, may extend either (1) through all of the coating layers or (2) through some but not all coatings, for example, a permeable slot 144 may be formed in one or more coating layers with a subsequently deposited layer bridging the slots, thereby effectively sealing the slots 144. Beneficially, the permeable slot 144 functions as a stress/strain relief for the structural coating(s). In addition, the permeable slot 144 can serve as a cooling means when it extends through all coatings, that is, for this configuration, the permeable slots 144 are configured to convey a coolant fluid from the respective channels 130 to an exterior surface of the component. Further, the permeable slot 144 can serve as a passive cooling means when bridged by the upper coatings, in the case when those coatings are damaged or spalled.

For the configuration shown in FIG. 10, a portion of the coating 150 is disposed within the crater(s) 180. As noted above, residual structural coating within the crater 180 will act as a cooling flow distributer, forcing the coolant to spread out inside the crater prior to exiting onto the external surface of the coated component.

As noted above, for the example configurations shown in FIGS. 3 and 7, the grooves 132 are formed in the substrate 110, and the craters 180 extend into the substrate. For the example configurations shown in FIGS. 13 and 14, the coating 150 comprises inner and outer structural coating layers 54, 56 and the grooves 132 and craters 180 are formed at least partially in the inner structural coating 54. For the configurations shown in FIGS. 13 and 14, the grooves and craters do not extend into the substrate 110. For other configurations, the grooves and craters extend through the inner structural coating layer 54 into the substrate 110.

Beneficially, the cratered exit regions are easily located for final shaping and machining. In addition, the cratered exit regions may be formed entirely by abrasive liquid jet drilling, thereby providing an economical means for forming the film exits.

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A manufacturing method comprising:
   forming one or more grooves in a component comprising a substrate, wherein each groove extends at least partially along the substrate and has a base, a top and at least one discharge end;
   forming one or more craters into the substrate, such that each crater is in direct fluid connection with the respective discharge end for each groove, and wherein each crater is formed normal to an outer surface of the substrate and extending from the outer surface to a same depth as that of a respective channel; and
   disposing a coating over at least a portion of an outer surface of the substrate, wherein the one or more grooves and the coating together define one or more channels for cooling the component, and wherein the coating does not completely bridge each of the one or more craters, such that an exit of each crater is in fluid communication with a film exit formed through the coating, wherein each of the one or more craters has a top surface diameter at least as large as an average width of the respective channel.

2. The manufacturing method of claim 1, further comprising casting the substrate prior to forming the one or more grooves and the one or more craters, wherein each groove is formed by directing an abrasive liquid jet at the outer surface of the substrate, and wherein each crater is formed using the abrasive liquid jet.

3. The manufacturing method of claim 1, wherein a perimeter of one of the one or more craters is beveled outward relative to the outer surface of the substrate.

4. The manufacturing method of claim 1, wherein the substrate has at least one interior space, the method further comprising forming one or more access holes, wherein each access hole is formed through the base of a respective groove, to connect the groove in fluid communication with the respective interior space.

5. The manufacturing method of claim 1, wherein the base of each groove is wider than the top, such that each groove comprises a re-entrant shaped groove.

6. The manufacturing method of claim 1, wherein a portion of the coating is deposited in the one or more craters, the method further comprising removing at least some of the coating deposited in each crater to form the film hole for the respective channel.

7. The manufacturing method of claim 1, wherein the coating comprises an outer layer of a structural coating, the method further comprising depositing an inner layer of the structural coating on the outer surface of the substrate prior to forming the one or more grooves and the one or more craters, wherein each groove and crater are formed at least partially in the inner structural coating.

8. The manufacturing method of claim 1, wherein the one or more grooves are formed in the substrate, and wherein the one or more craters extend into the substrate.

9. A component comprising:
   a substrate comprising an outer surface and an inner surface, wherein the component defines one or more grooves and one or more craters, wherein each groove extends at least partially along the substrate and has a base and at least one discharge end, and wherein each crater is in direct fluid connection with the respective discharge end for a respective groove, and formed normal to an outer surface of the substrate and extending from the outer surface to a same depth as that of a respective channel; and
   a coating disposed over at least a portion of the outer surface of the substrate, such that the one or more grooves and the coating together define one or more channels for cooling the component, and wherein the coating does not completely bridge each of the one or more craters, such that an exit of each crater is in fluid communication with a film exit formed through the coating for the respective channel,
   wherein each of the one or more craters has a top surface diameter at least as large as an average width of the respective channel.

10. The component of claim 9, wherein a perimeter of one of the one or more craters is beveled outward relative to the outer surface of the substrate.

11. The component of claim 9, wherein a perimeter of one of the one or more craters is beveled inward relative to the outer surface of the substrate.

12. The component of claim 9, wherein the base of each groove is wider than the top, such that each groove comprises a re-entrant shaped groove.

13. The component of claim 9, wherein a portion of the coating is disposed within the one or more craters.

14. The component of claim 9, wherein the one or more grooves are formed in the substrate, and wherein the one or more craters extend into the substrate.

15. The component of claim 9, wherein the coating comprises an inner structural coating layer disposed on the outer surface of the substrate and an outer structural coating layer disposed on the inner structural coating layer, wherein each groove and crater are formed at least partially in the inner structural coating layer.

* * * * *